United States Patent
Cho et al.

(10) Patent No.: US 9,535,661 B2
(45) Date of Patent: Jan. 3, 2017

(54) METHOD AND DEVICE FOR REMOVING BIASING DUE TO SIGNAL SOURCE DURING RANDOM NUMBER GENERATION

(71) Applicant: SK TELECOM CO., LTD., Seoul (KR)

(72) Inventors: Jeong-sik Cho, Daejeon (KR); Jeong-woon Choi, Yongin-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/693,801

(22) Filed: Apr. 22, 2015

(65) Prior Publication Data

US 2015/0227345 A1    Aug. 13, 2015

Related U.S. Application Data

(63) Continuation of application No. PCT/KR2013/007509, filed on Aug. 21, 2013.

(30) Foreign Application Priority Data

Oct. 24, 2012  (KR) .................. 10-2012-0118558

(51) Int. Cl.
  *G06F 7/58*   (2006.01)
  *G06F 7/76*   (2006.01)

(52) U.S. Cl.
  CPC ............... *G06F 7/588* (2013.01); *G06F 7/58* (2013.01); *G06F 7/76* (2013.01)

(58) Field of Classification Search
  CPC ............. G06F 7/588; G06F 7/58; G06F 7/76
  USPC ......................................... 708/255
  See application file for complete search history.

(56) References Cited

U.S. PATENT DOCUMENTS

| | | | | |
|---|---|---|---|---|
| 5,428,561 | A * | 6/1995 | Bryant | G06F 7/582 708/250 |
| 6,571,263 | B1 * | 5/2003 | Nagai | H04L 9/0861 708/255 |
| 7,734,672 | B2 * | 6/2010 | Liardet | H03K 3/84 708/250 |
| 2009/0265112 | A1 * | 10/2009 | Wilber | B82Y 10/00 702/19 |
| 2010/0005128 | A1 | 1/2010 | Ergun | |

FOREIGN PATENT DOCUMENTS

| | | |
|---|---|---|
| JP | 2007207054 A | 8/2007 |
| JP | 2010251870 A | 11/2010 |
| KR | 1020110060080 A | 6/2011 |
| WO | 2012006417 A1 | 5/2012 |

OTHER PUBLICATIONS

International Search Report for PCT/KR2013/007509 dated Dec. 5, 2013.

* cited by examiner

*Primary Examiner* — Tan V. Mai
(74) *Attorney, Agent, or Firm* — Hauptman Ham, LLP

(57) ABSTRACT

The present disclosure provides a method and an apparatus for removing biasing due to a signal source during random number generation. At least one embodiment includes a method, performed by a random number generation apparatus, for generating a random number having a signal source biasing removed, including: generating a raw bit string by sampling, at a predetermined cycle, a physical signal input from a signal source; and generating the random number by performing block partial sum or sequential partial sum on the generated raw bit string.

14 Claims, 24 Drawing Sheets

METHOD AND DEVICE FOR REMOVING BIASING DUE TO SIGNAL SOURCE DURING RANDOM NUMBER GENERATION

CROSS-REFERENCE TO RELATED APPLICATIONS

The present application is a continuation of International Patent Application No. PCT/KR2013/007509, filed Aug. 21, 2013, which is based upon and claims the benefit of priority to Korean Patent Application No. 10-2012-0118558, filed on Oct. 24, 2012. The disclosure of the above-listed applications are hereby incorporated by reference herein in their entirely.

TECHNICAL FIELD

The present disclosure in one or more embodiments relates to a method and apparatus for removing biasing of a random number sequence caused by deviation present in a signal source during random number generation.

BACKGROUND

The statements in this section merely provide background information related to the present disclosure and do not necessarily constitute prior art.

Random numbers are usually generated by using a signal source with a noise characteristic or a metastable characteristic for sampling the signal source outputs and comparing the same with a reference value. It is noted that all output values of the random number are supposed to have no correlation, and it is necessary to have a uniform frequency of occurrence of all n values that make up the n-ary random numbers.

However, it is also noted that when using thermal noise as the signal source or using a metastable state, considerable correlation occurs between the signals before and after the generated random number, wherein the proportion of a particular value is far greater than those of other values, which is called biasing.

FIG. 1 is a diagram illustrating biasing present in the resulting sample values from sampling a signal source with deviation.

When a deviation occurs in the signal source due to changes in the external environment or for other reasons, its resulting sample values inherit the biasing that occurs due to a high frequency of occurrence of a particular value. For example, section B of the resulting sample in FIG. 1 shows 1s more frequently than 0s, which is due to the signal source having the deviation in that time zone.

Since such biasing lowers the utility of generated random numbers, there are various methods, attempting to overcome the biasing issue. It is noted that the typical solution to the biasing issue is analyzing sample signals and monitoring whether values that make up the random numbers are generated in a certain ratio for performing appropriate control and signal processing.

For example, a structure for generating a random number using noise as a signal source is configured in such a way that a direct current (DC) filter or a high pass filter is disposed between noise and sampling circuits so as to remove an average value that deviates from a central value.

Korean Patent Application Publication No. 2007-0036799 discloses a method for sampling a signal, analyzing the sample value using a signal processing circuit, and then feeding back an offset controlling signal to a sampling circuit with an offset function for input signal decision threshold.

Examples of other methods using signal processing include a method for scrambling sample signals by a signal processing circuit disposed after a sampling circuit (Korean Patent Application Publication No. 10-2005-0084153) and a method for analyzing and equalizing sample values (Korean Patent Application Publication No. 10-2003-0027724).

However, the inventor(s) experienced that among these methods for overcoming the biasing, the method for feeding back deviation of a signal source possibly causes an unintended DC deviation. The inventor(s) also experienced that In the signal processing method such as scrambling, equalization, and so on, when using an algorithm, the merit of a generated random number as a random number is degraded due to its calculability like a pseudo random number, and a relatively complex or high-performance circuit is needed, requiring a long time for signal processing such as scrambling, equalization, and so on.

SUMMARY

In accordance with some embodiments of the present disclosure, a method, performed by a random number generation apparatus, for generating a random number having a signal source biasing is removed, includes: generating a raw bit string by sampling, at a predetermined cycle, a physical signal input from a signal source, and generating the random number by performing block partial sum or sequential partial sum of the generated raw bit string.

In accordance with another aspect of the present disclosure, a method, performed by a random number generation apparatus, for generating random numbers having a signal source biasing removed, includes: generating a plurality of raw bit strings by sampling, at a predetermined cycle, respective physical signals input from a plurality of signal sources; and generating random numbers by performing parallel partial sum on the plurality of raw bit strings.

In accordance with yet another aspect of the present disclosure, a method, performed by a random number generation apparatus, for generating a random number having a signal source biasing removed, includes: generating raw bit strings for respective physical signals by sampling the physical signals input from a plurality of signal sources at a predetermined cycle; generating a plurality of parity bit strings by performing block partial sum or sequential partial sum on the respective raw bit strings; and generating the random number by sequentially arranging parity bits included in the plurality of parity bit strings in a generation sequence of the parity bits.

In accordance with yet another aspect of the present disclosure, an apparatus for generating a random number having a signal source biasing removed, includes: a signal source configured to generate a physical signal as a basis for generating the random number; a clock generator configured to generate a clock having a predetermined frequency; a sampler configured to output a bit value of 0 or 1 according to a result obtained by comparing a value from sampling the physical signal with a predetermined reference value at each clock; and a calculator configured to perform block partial sum or sequential partial sum on a bit string as an output of the sampler to generate the random number.

In accordance with yet another aspect of the present disclosure, an apparatus for generating a random number having a signal source biasing removed, includes: a plurality of random number generators each configured to generate a raw bit string from physical phenomena; and a calculator configured to generate a random number sequence by performing parallel partial sum on a plurality of raw bit strings generated by the plurality of random number generators.

In accordance with yet another aspect of the present disclosure, an apparatus for generating a random number having a signal source biasing removed, includes: a plurality of random number generators each configured to generate a raw bit string from physical phenomena; and a calculator configured to generate a plurality of parity bit strings by performing block partial sum or sequential partial sum on the respective raw bit strings generated by the plurality of random number generators, and generate a random number sequence by sequentially arranging respective parity bits included in the plurality of parity bit strings in a generation sequence of the parity bits.

DETAILED DESCRIPTION

Figure 1:
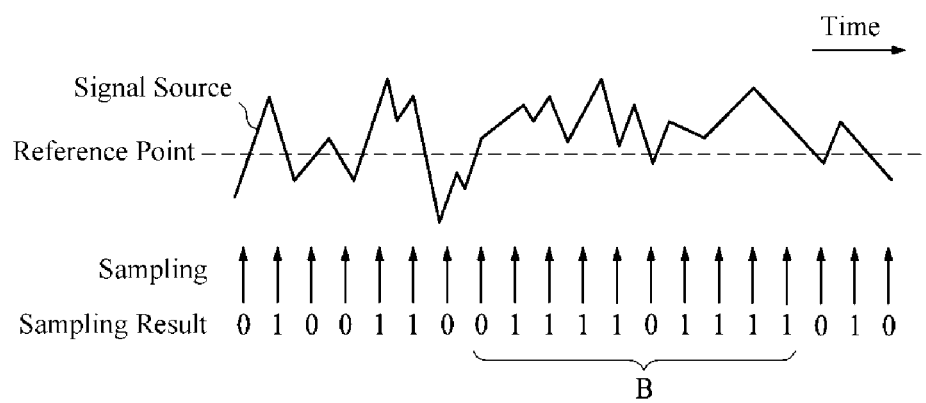
FIG. 1 is an exemplary diagram of biasing present in the resulting sample values from sampling a signal source with deviation.

In some embodiments, the present disclosure provides a random number generation apparatus that alleviates biasing via a simple calculation without analysis of a sample signal during random number generation using a signal source with deviation and for widening a range of biasing alleviation to configure a robust circuit depending on configuration.

Hereinafter, at least one embodiment of the present disclosure is described in detail with reference to the accompanying drawings. In the following description, like reference numerals designate like elements, although the elements are shown in different drawings. Further, in the following description of the at least one embodiment, a detailed description of known functions and configurations incorporated herein is omitted for clarity and brevity.

Throughout the specification, one of ordinary skill would understand terms 'include', 'comprise', and 'have' to be interpreted in default as inclusive or open rather than exclusive or closed unless expressly defined to the contrary. Further, the terms such as "unit", "module", etc. disclosed in the specification mean units for processing at least one function or operation, which are implemented by hardware, software, or a combination thereof.

According to at least one embodiment of the present disclosure, in order to remove biasing generated in random numbers generated by sampling outputs of a signal source due to deviation of the signal source, partial sum is performed on the sample value. FIGS. 2-5 are diagrams of embodiments in which a random number is generated using one signal source. With reference to FIGS. 2-5, a method and apparatus for removing influence due to deviation of a signal source during random number generation, according to at least one embodiment of the present disclosure is described below.

Figure 2A:
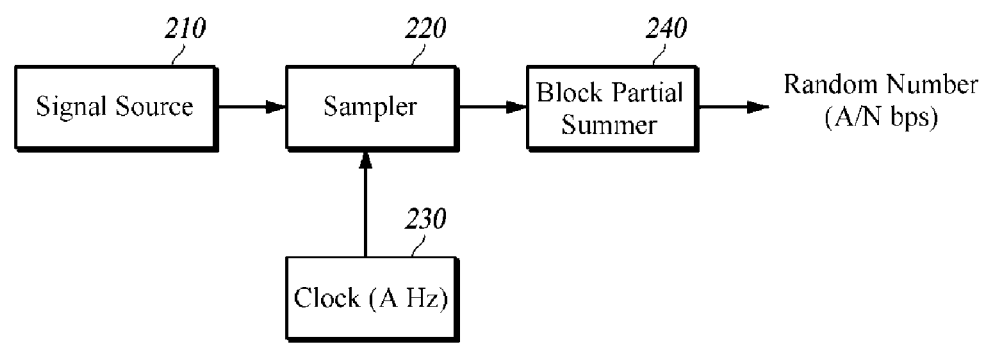
FIG. 2A is an exemplary schematic block diagram of a random number generation apparatus using block partial sum, according to at least one embodiment of the present disclosure.

FIG. 2A is an exemplary schematic block diagram of a random number generation apparatus using block partial sum, according to at least one embodiment of the present disclosure.

As illustrated in FIG. 2A, the random number generation apparatus according to at least one embodiment of the present disclosure is configured to apply block partial sum to an output of a sampler 220 that compares a value (hereinafter, referred to as a 'sample value') from sampling an output of a signal source 210 according to a clock signal with a predetermined reference value to output bits of 0 or 1.

In some embodiments, the components 220, 230, and 240 of the random number generation apparatus are logically distinguished based on their functions rather than being physically distinguished. In addition, as the random number generation apparatus illustrated in FIG. 2A, a random number generator for sampling an output of a signal source according to a clock signal to generate a random number and a post-processor for performing block partial sum as post-processing calculation for removing the influence of deviation of the signal source from the generated random number are illustrated. Hereinafter, at least one other embodiment of the present disclosure is understood in the same or similar way.

In at least one embodiment, one or more components of the random number generation apparatus described herein is/are implemented by, and/or include(s), one or more processors and/or application-specific integrated circuits (ASICs) and/or non-transitory computer-readable medium (media). In one or more embodiments, the random number generation apparatus comprises input units, for example, as one or more buttons, a touch screen, a mic and so on, and/or output units, for example a display, an indicator and so on.

Figure 2B:
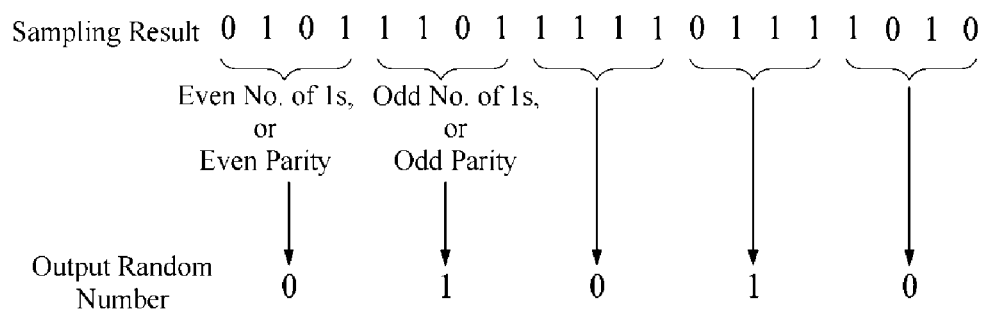
FIG. 2B is an exemplary diagram of an example of a method for performing block partial sum on sample values.

FIG. 2B is an exemplary diagram of an example of a method for performing block partial sum on sample values.

As illustrated in FIG. 2B, partial sum refers to a calculation for checking whether the number of 1s or 0s included in a predetermined number of bits is an even number or an odd number, in other words, a parity calculation. When the number of 1s is an even number, an output random number is determined as 1 or 0, which is determined merely according to a design method and does not affect a method proposed by the present disclosure.

When a binary random number generator determines each sample value as 1 or 0 to output, and where the possibility that 1 is output is p, if the partial sum for N samples is applied, the possibility that the number of output 1s is k is represented according to Equation 1 below.

$$P(N, k) = {}_N C_k \cdot p^k (1-p)^{N-k} = \frac{N!}{k!(N-k)!} \cdot p^k (1-p)^{N-k} \quad \text{(Equation 1)}$$

From Equation 1 above, the possibility that the number of 1s is an even number is represented according to Equation 2 below and the possibility that the number of 1s is an odd number is represented according to Equation 3 below.

$$P(N, k_{even}) = \sum_{k=0, even} {}_N C_k \cdot p^k (1-p)^{N-k} \quad \text{(Equation 2)}$$
$$= (1-p)^N + \frac{N(N-1)}{2} p^2 (1-p)^{N-2} + \ldots$$

$$P(N, k_{odd}) = \sum_{k=odd} {}_N C_k \cdot p^k (1-p)^{N-k} \quad \text{(Equation 3)}$$
$$= Np(1-p)^{N-1} + \frac{N(N-1)(N-2)}{6} p^3 (1-p)^{N-3} + \ldots$$

Figure 3A:
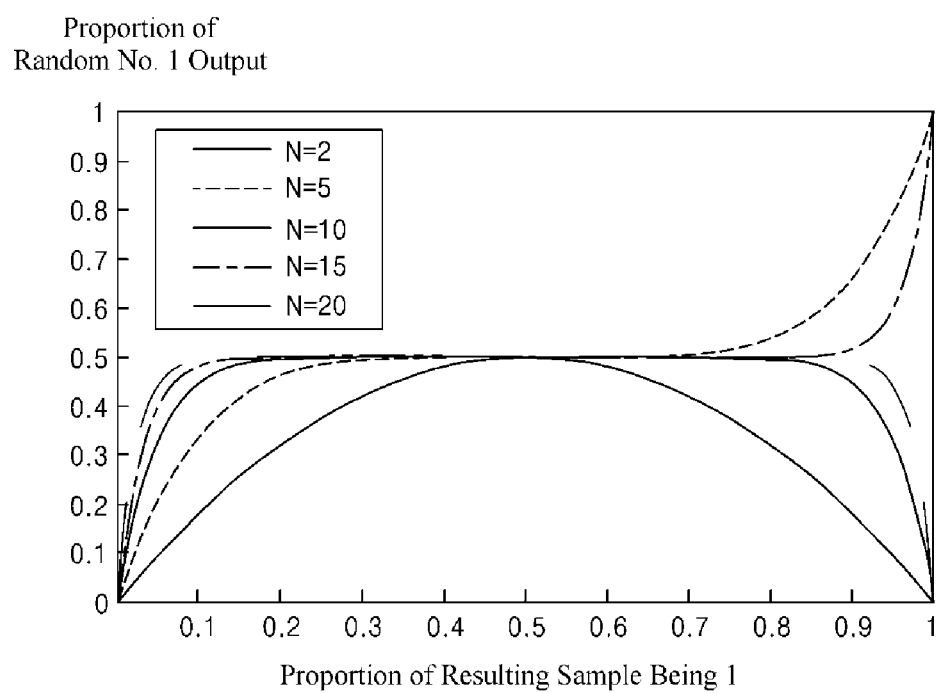
FIG. 3A is an exemplary graph representation of Equations 2 and 3 for illustrating the proportion of binary random number 1s, changing in accordance with p values when N is 2, 5, 10, 15 or 20.

FIG. 3A is an exemplary graph representation of Equations 2 and 3 for illustrating the proportion of binary random number is changing in accordance with p values where N is 2, 5, 10, 15 or 20.

As seen from FIG. 3A, as the number of samples N increases, the proportion of random number 1s generated by a random number generator becomes close to 0.5 even if p significantly deviates from 0.5 as an ideal value.

Figure 3B:
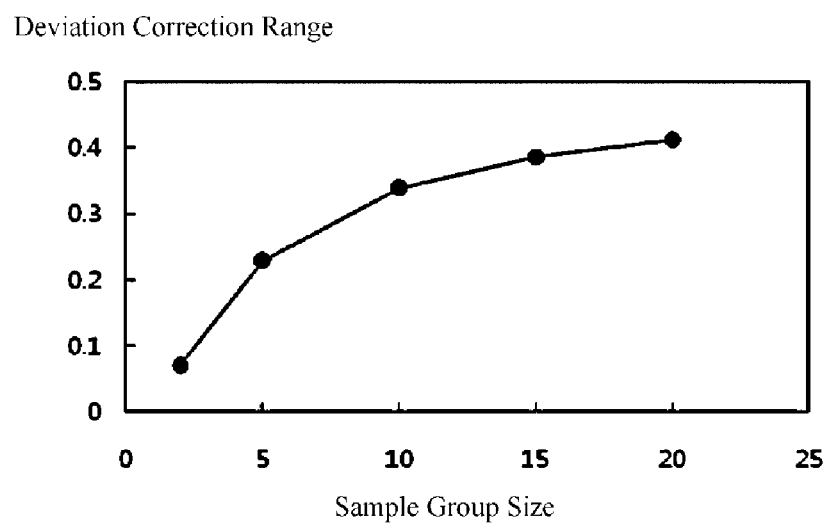
FIG. 3B is an exemplary diagram of the range of p values according to N values, which causes the proportion of is among the outputs of a random number generator to be in the range of not more than +/−0.01 (1% biasing) of 0.5.

FIG. 3B is an exemplary diagram of the range of p values according to N values, which causes the proportion of 1 among the outputs of a random number generator to be in the range of not more than +/−0.01 (1% biasing) of 0.5.

As seen from FIG. 3B, as N, the size of the partial sum group increases, a value having a high biasing is suppressed more. However, when block partial sum is applied, if N is increased, random number generation rate is reduced to 1/N of a sampling frequency, and thus an appropriate value is selected.

Figure 4A:
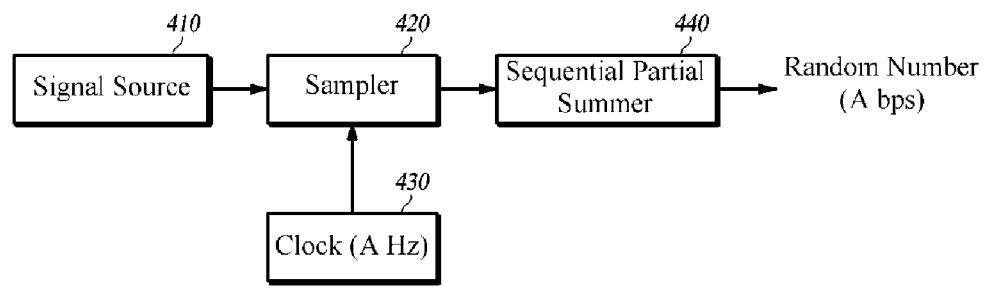
FIG. 4A is an exemplary schematic block diagram of a random number generation apparatus using sequential partial sum, according to at least one embodiment of the present disclosure.
Figure 4B:
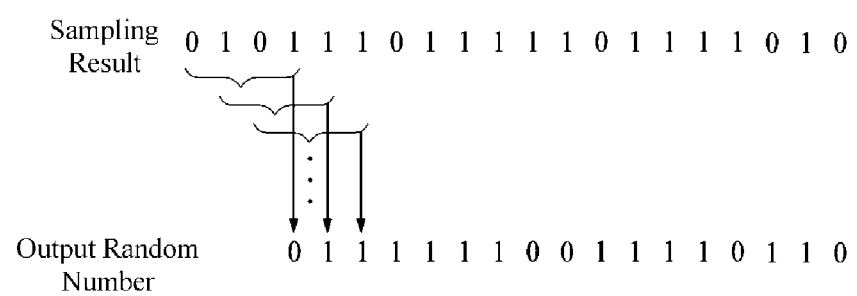
FIG. 4B is an exemplary diagram of an example of a method for performing sequential partial sum on sample values.

FIG. 4A is an exemplary schematic block diagram of a random number generation apparatus using sequential partial sum, according to at least one embodiment of the present disclosure. FIG. 4B is a diagram of an example of a method for performing sequential partial sum on sample values.

As illustrated in FIG. 4B, sequential partial sum refers to partial sum for shifting a selection range of sample values one by one when N partial sums are selected. In other words, the sequential partial sum refers to a method for calculating a parity bit by applying a mask of a predetermined size to a raw bit string, while moving the mask at least one bit by one bit, from a point where a parity bit is currently generated. In an embodiment, when the sequential partial sum is applied, the same rate as a sampling frequency (A Hz) is obtained as a random number generation rate (A bps).

FIGS. 5A-D are exemplary diagrams of the results of numerical modeling of an embodiment of applying the partial sum to a signal source with deviation.

Figure 5A:
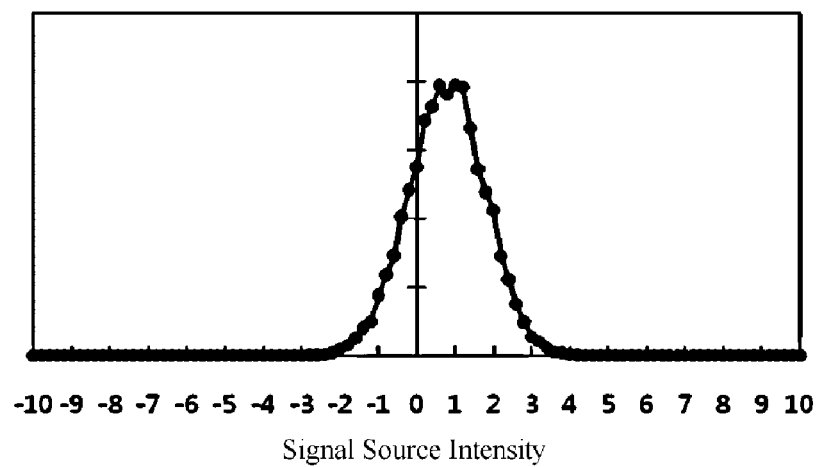
FIGS. 5A-D are exemplary diagrams of the results of numerical modeling of an embodiment of applying the partial sum to a signal source with a deviation.
Figure 5B:
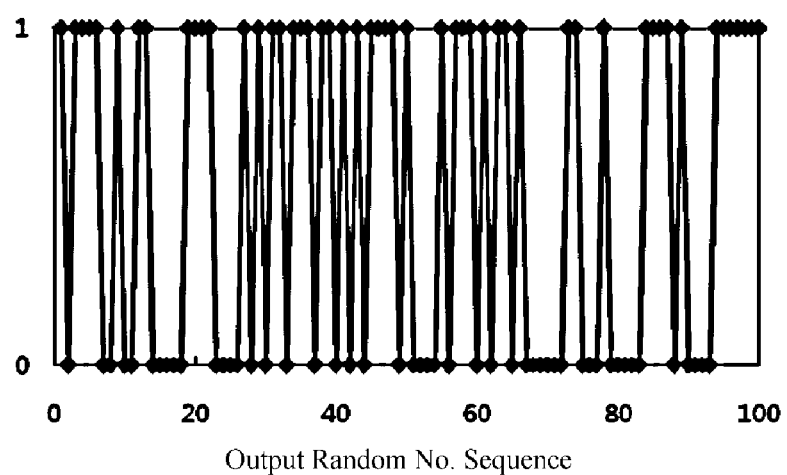
Figure 5C:
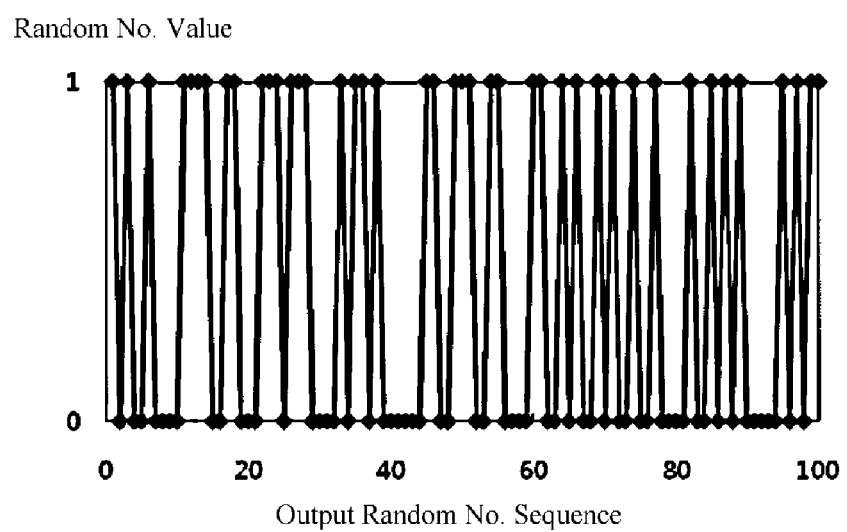
Figure 5D:
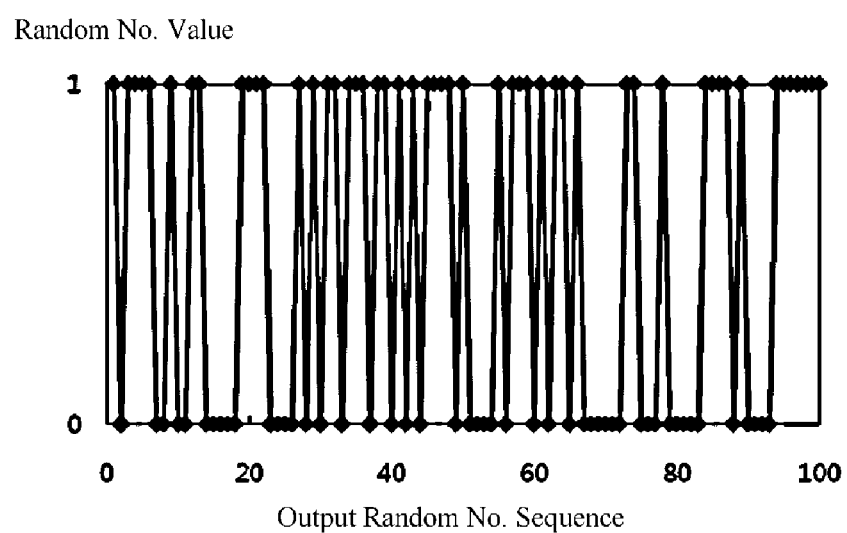

FIG. 5A is an exemplary diagram of distribution of noise intensity according to a Gaussian distribution. FIG. 5B is an exemplary diagram of the results of sampling noise of FIG. 5A to generate a binary random number. A relatively high count of 1s is obtained and the probability that 1 is output is about 78.6%. FIG. 5C is an exemplary diagram of the results of application of block partial sum embodiment with N of 10, and the proportion of 1 output is about 49.0% which is close to 50%. FIG. 5D is an exemplary diagram of the results of application of sequential partial sum embodiment where N is 10, and the proportion of 1 output is about 50.8% which is close to 50%. It is seen that, even if a signal source with the proportion of 1 output is increased to about 0.8 is used, as illustrated in FIG. 5B, when block partial sum or sequential partial sum where N=10 is applied according to at least one embodiment of the present disclosure, the proportion of 1 output approaches 0.5.

Figure 6:
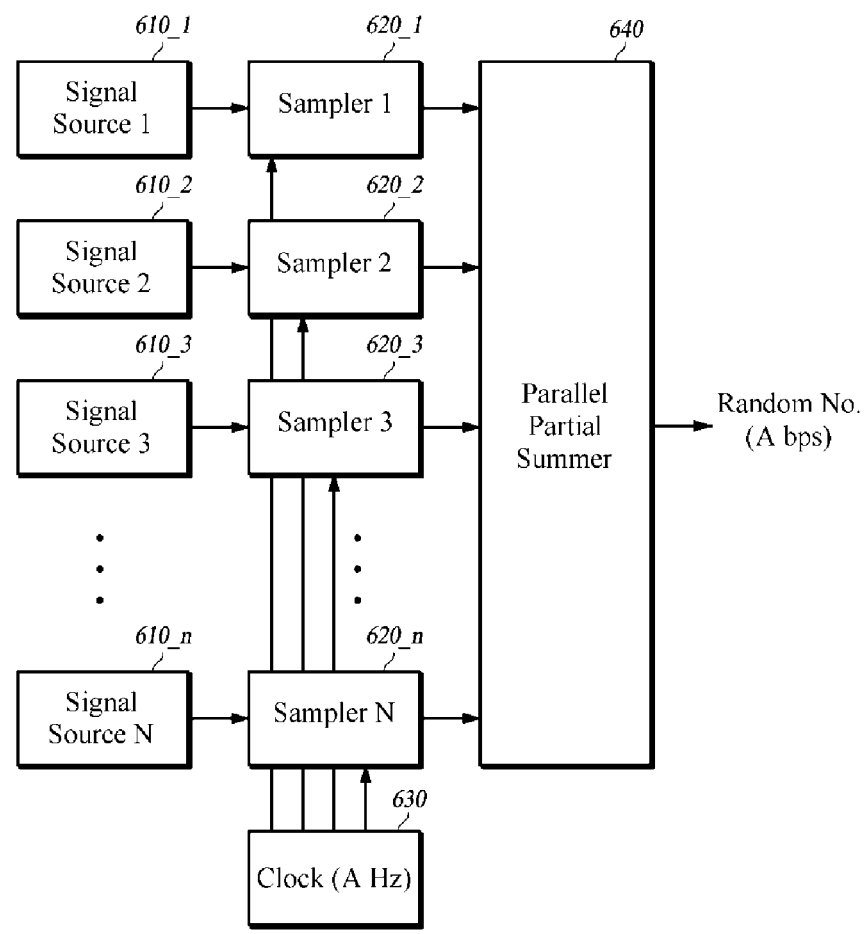
FIG. 6 is an exemplary diagram of an embodiment of applying the partial sum to generating a random number by using a plurality of signal sources, according to at least one embodiment of the present disclosure.
Figure 7:
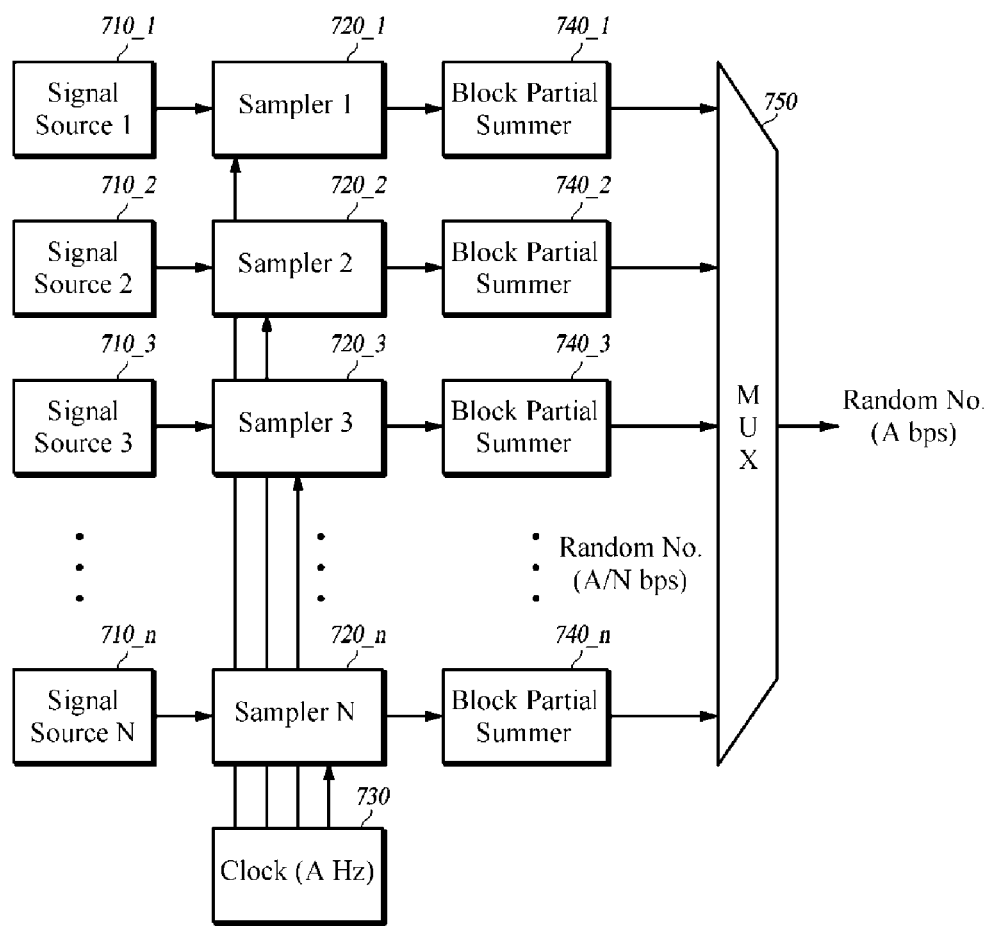
FIG. 7 is an exemplary schematic diagram of a method for increasing the random number generation rate based on the block partial sum embodiment of FIG. 2, by using an embodiment of the plurality of signal sources of FIG. 6 and time multiplexing the respective outputs.
Figure 8:
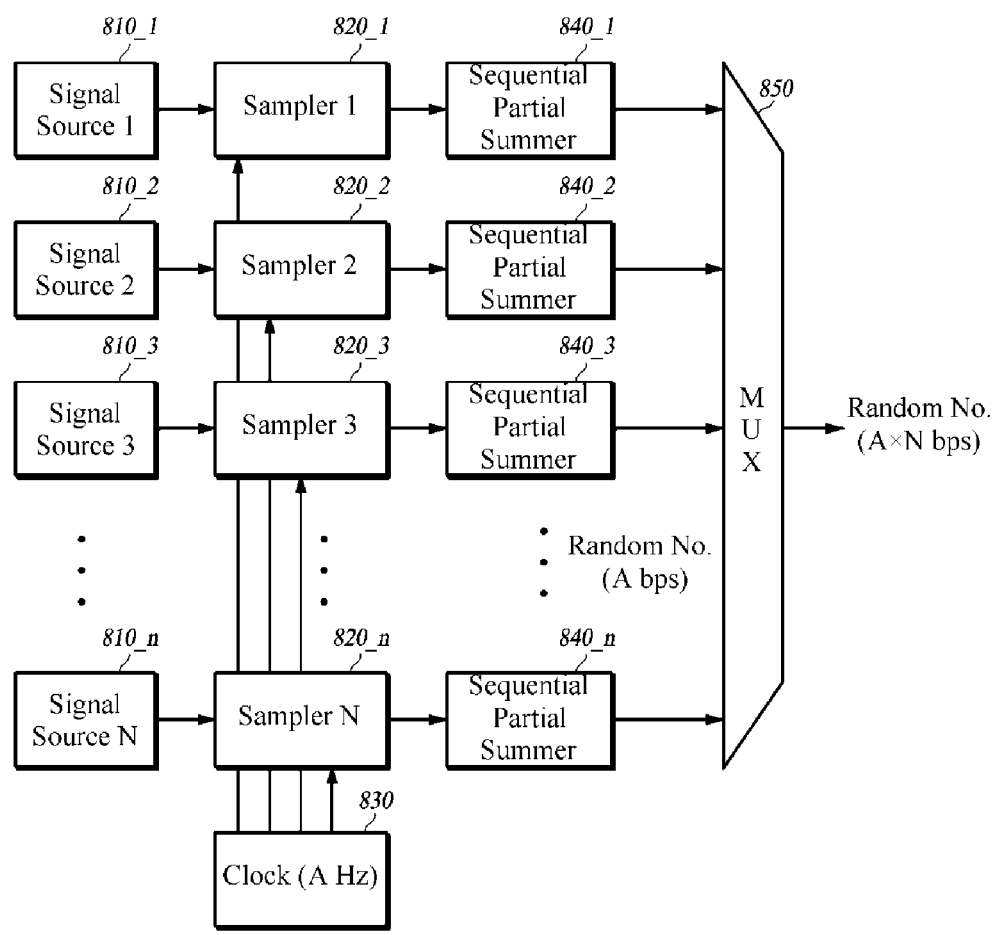
FIG. 8 is an exemplary schematic diagram of a method for increasing the random number generation rate based on the sequential partial sum embodiment of FIG. 4, by using the plurality of signal sources embodiment of FIG. 6 and time multiplexing the respective outputs.

FIGS. 6-8 are exemplary diagrams of one or more embodiments of generating a random number using a plurality of independent signal sources. With reference to FIGS. 6-8, a method and apparatus for removing influence due to deviation of a signal source during random number generation, according to at least one embodiment of the present disclosure are described below.

FIG. 6 is an exemplary diagram of the partial sum during random number generation configured to receive a plurality of signal sources, according to at least one embodiment of the present disclosure.

When a random number generator is configured with N independent signal sources 610_1 to 610_n as illustrated in FIG. 6, if outputs of the N signal sources 610_1 to 610_n are independently sampled using N samplers 620_1 to 620_n, and then parallel partial sum is performed, biasing is substantially suppressed in a final output random number despite independent deviations of the N signal sources 610_1 to 610_n. In some embodiments, the parallel partial sum refers to an operation for calculating, at each clock, a parity bit for N sample values output to the same clock from N samplers.

FIG. 7 is an exemplary schematic diagram of the partial sum during random number generation configured to receive a plurality of signal sources, according to at least one embodiment of the present disclosure.

The embodiment shown in FIG. 7 compensates for the reduction in the random number generation rate based on the block partial sum of FIG. 2, by using a plurality of signal sources 710_1 to 710_n to the embodiment of FIG. 6 and time multiplexing the respective outputs.

In FIG. 7, a random number is generated by performing block partial sum on raw bit strings, output by samplers 720_1 to 710_n, and then sequentially listing the resulting values. For example, when a block size is N for block partial sum, the output rate of each block partial sum is reduced to 1/N of a clock frequency (A Hz), but the random number generation rate is re-increased to N times due to the N samplers and becomes equal to the clock frequency.

FIG. 8 is an exemplary schematic diagram of a method for increasing the random number generation rate based on the sequential partial sum embodiment of FIG. 4, by using the plurality of signal sources embodiment in FIG. 6 and time multiplexing the respective outputs. When a random number is generated by performing sequential partial sum on outputs of N samplers 820_1 to 820_n, and then sequentially listing the resulting values, the random number generation rate is increased to N times the clock frequency (A Hz).

FIGS. 9A-D are exemplary diagrams of the results of numerical modeling embodiments of generating random numbers by using ten different signal sources having independent deviations.

Figure 9A:
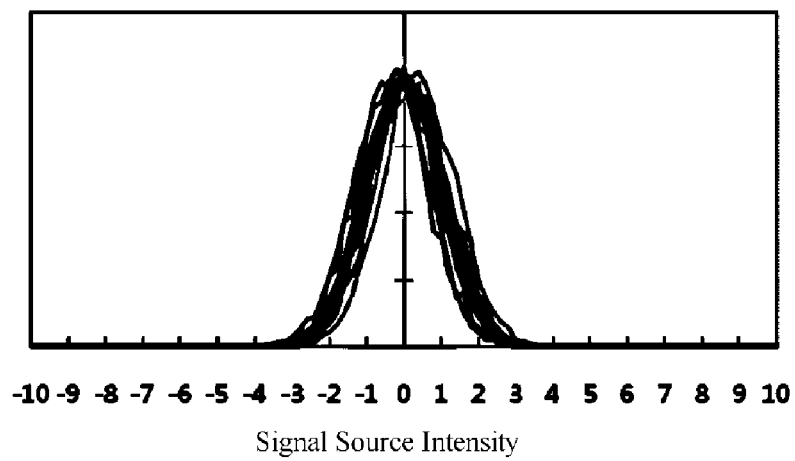
FIGS. 9A-D are exemplary diagrams of the results of numerical modeling of processes of generating random numbers by using ten different signal sources with independent deviations.
Figure 9B:
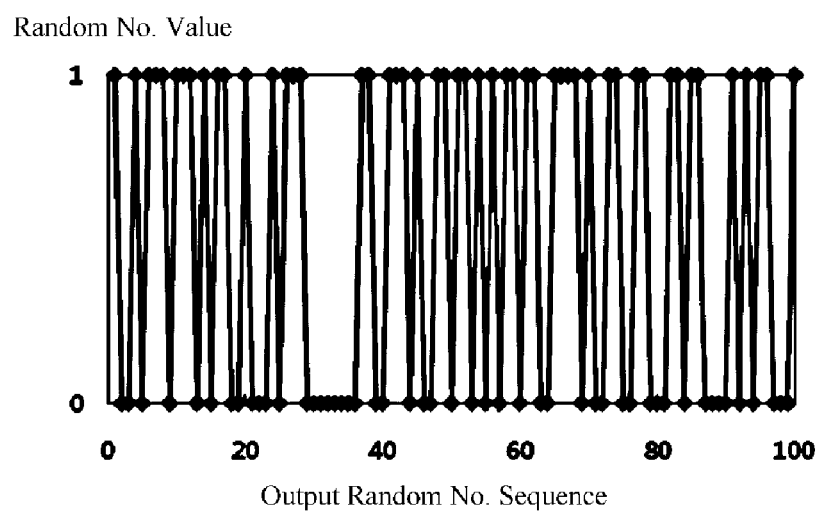
Figure 9C:
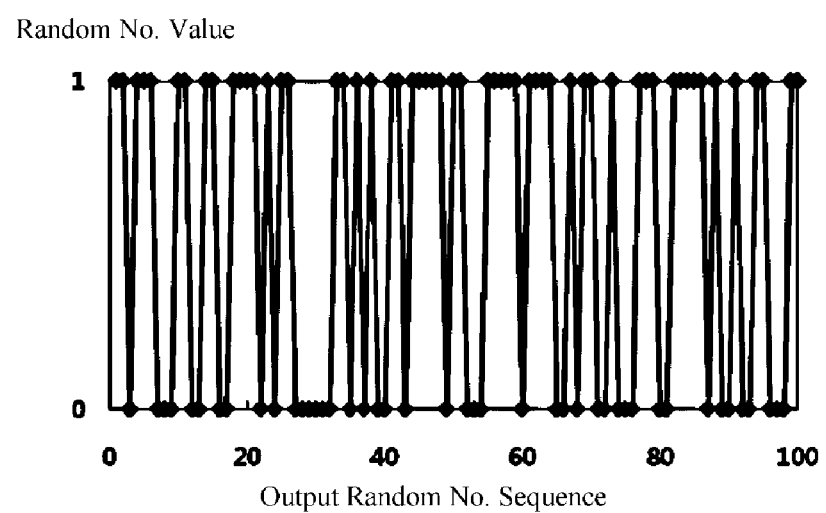
Figure 9D:
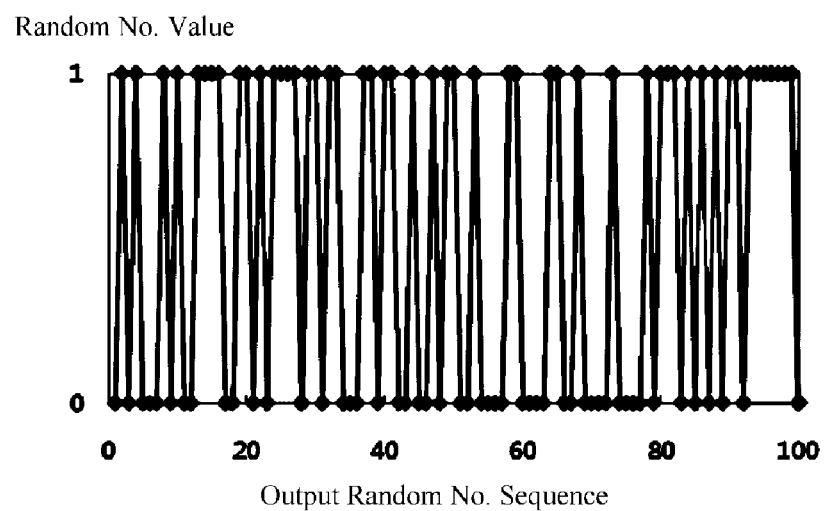

FIG. 9A is an exemplary diagram of distribution of intensity of ten signal sources with independent deviations according to Gaussian distribution. FIG. 9B is an exemplary diagram of the results of application of parallel partial sum embodiment and the proportion of 1 output is about 49.9%. FIG. 9C is an exemplary diagram of the results of application of block partial sum embodiment and then time multiplexing and the proportion of 1 output is about 49.5%. FIG. 9D is an exemplary diagram of the results of application of sequential partial sum embodiment, and then time multiplexing and the proportion of 1 output is about 49.3%. As seen from FIGS. 9A-D, the proportion of a random number 1 output is adjusted to be close to 50% via partial sum.

Figure 10A:
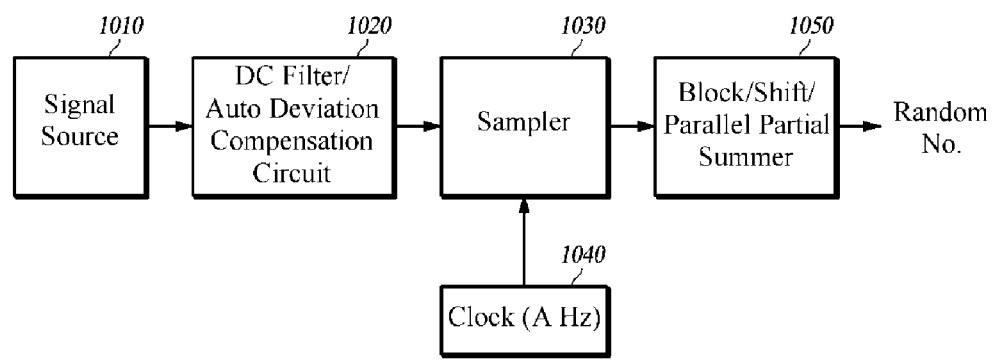
FIGS. 10A and 10B are exemplary schematic diagrams of a structure formed by combining a partial summer, according to an embodiment of the present disclosure and a conventional signal source deviation remover embodiment.
Figure 10B:
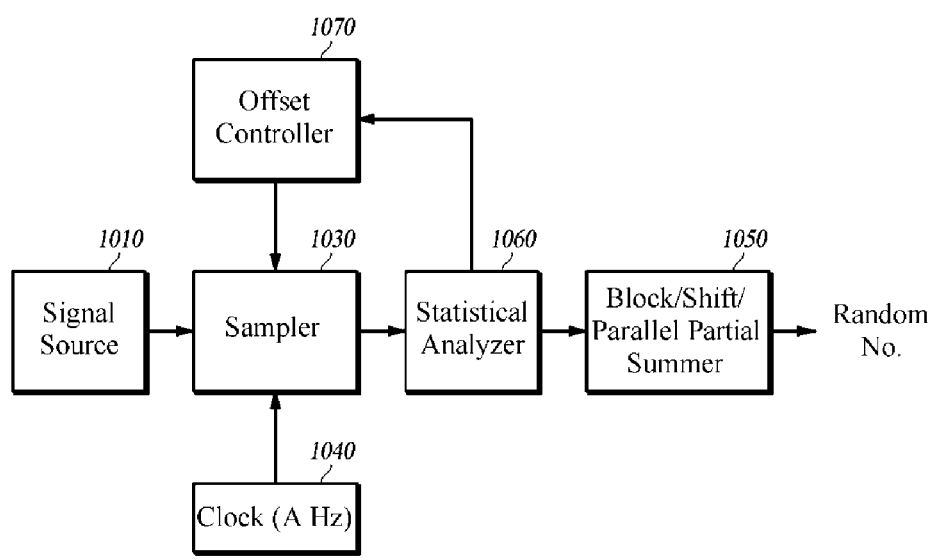

FIGS. 10A and 10B are exemplary schematic diagrams of a structure that combines a partial summer embodiment and a signal source deviation remover.

The aforementioned one or more embodiments of the present disclosure correspond to a post-processing method for removing biasing contained in a sample value by performing block/shift/parallel partial sum on the resulting value from sampling a physical signal supplied from a signal source. Accordingly, a method for removing a signal source deviation in a previous operation is applied in the same way.

For example, as illustrated in FIG. 10A, a physical signal supplied from a signal source is passed through a DC filter or auto deviation compensation circuit 1020 prior to being sampled by a sampler 1030, and thus, the physical signal having deviation removed by a predetermined degree is sampled, and then block/shift/parallel partial sum is performed according to at least one embodiment of the present disclosure.

As illustrated in FIG. 10B, offset control circuits 1060 to 1070 each configured to analyze deviation of outputs of the sampler 1030 and to feedback a feedback signal for removing the deviation to the sampler 1030 to control a comparison reference value of the sampler 1030, control the sampler 1030 to output a sample value with deviation removed by a predetermined degree, and then perform block/shift/parallel partial sum according to at least one embodiment of the present disclosure.

Although FIGS. 10A and 10B are exemplary diagrams of embodiments in which one signal is used, the same method as in FIGS. 10A and 10B are also applied to an embodiment in which a plurality of signal sources is used.

Figure 11A:
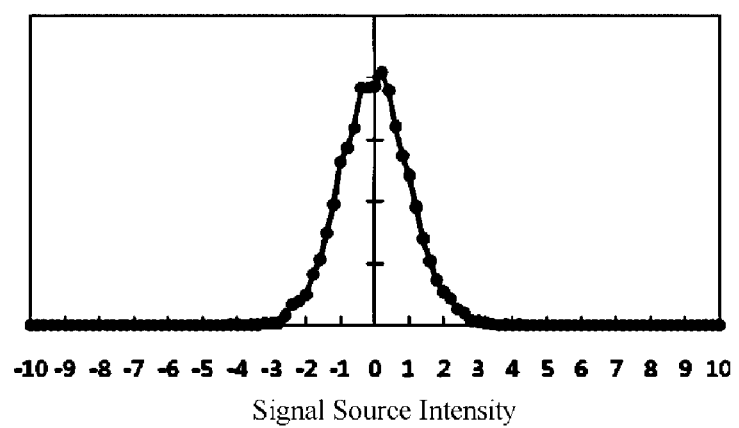
FIGS. 11A-D are exemplary diagrams of the results of a numerical modeling embodiment of a single signal source which does not include deviation.

FIG. 11AD are exemplary diagram of the results of numerical modeling embodiments of a single signal source which does not have deviation.

Figure 11B:
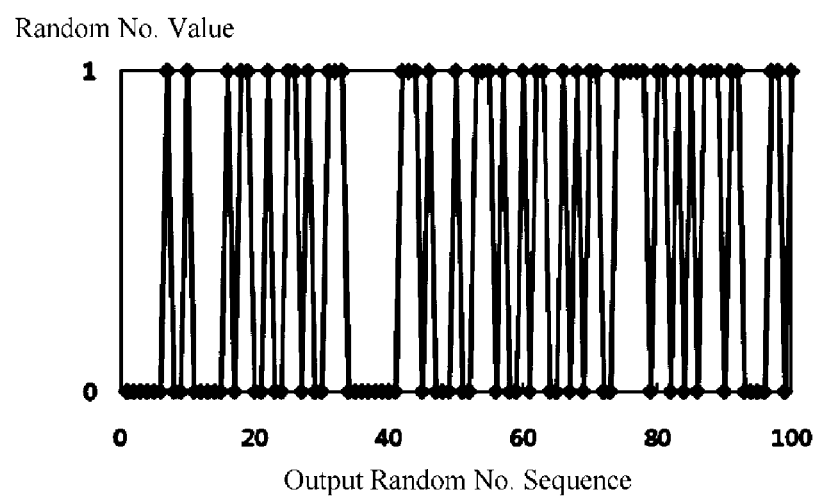
Figure 11C:
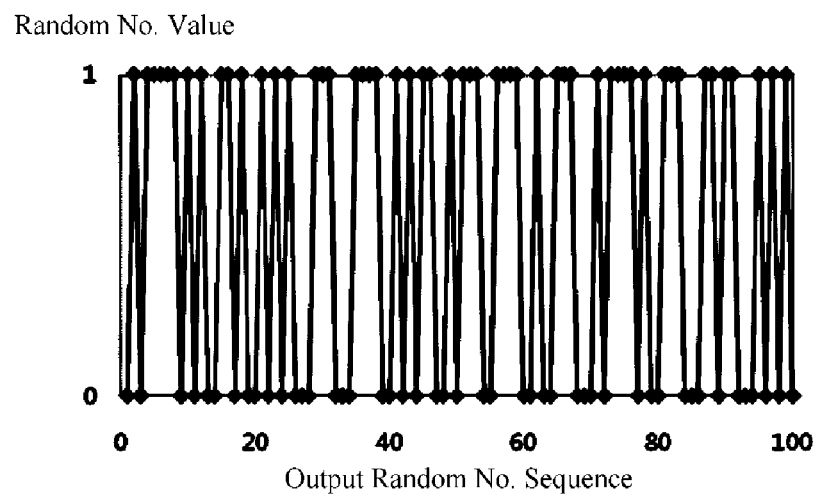
Figure 11D:
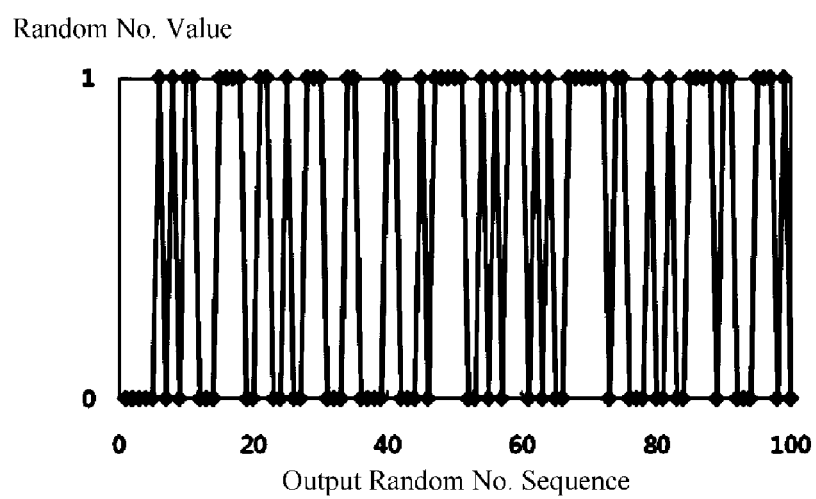

FIG. 11A is an exemplary diagram of distribution of signal values of a single signal source which does not have deviation. FIG. 11B is an exemplary diagram of the result from sampling a signal of a single signal source. FIG. 11C is an exemplary diagram of the result from application of block partial sum embodiment to sample values of FIG. 11B. FIG. 11D is an exemplary diagram of the result from application of sequential partial sum embodiment to the sample values of FIG. 11B. As seen from FIGS. 11B-D, the proportions of 1 output are 49.8%, 49.6%, and 50.0%, and thus even if block/sequential partial sum according to at least one embodiment of the present disclosure is applied to an original sample value close to 50% to generate a random number, biasing is not increasingly generated in an opposite way in the generated random number.

Although the aforementioned methods using partial sum proposed by the one or more embodiments of the present disclosure have been described in terms of a binary random number, the methods can also be applied to an n-order random number, and the methods using partial sum proposed by the one or more embodiments of the present disclosure can be expanded to n-order random number generation. In other words, the methods using partial sum proposed by the one or more embodiments of the present disclosure can be applied to generation of an a-bit random number by grouping results of partial sum on a group basis or generation of a b-bit random number by grouping results of partial sum on b group basis after separately applying partial sum to b signal sources.

According to various embodiments of the present disclosure as described above, only very simple calculation is required to enable the debiasing configuration to be simpler than using a known signal processing circuit such as a scrambler, an equalizer, etc., and an output with its biasing well suppressed is obtained without a feedback circuit or other additional control circuits even with a high deviation of a signal source.

Although exemplary embodiments of the present disclosure have been described for illustrative purposes, those skilled in the art will appreciate that various modifications, additions and substitutions are possible, without departing from the characteristics of the disclosure. Specific terms used in this disclosure and drawings are used for illustrative purposes and not to be considered as limitations of the present disclosure. Therefore, exemplary embodiments of the present disclosure have been described for the sake of brevity and clarity.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method, performed by a random number generation apparatus, for generating a random number having a signal source biasing removed, the method comprising:
   generating a raw bit string by sampling, at a predetermined cycle, a physical signal input from a signal source; and
   generating the random number by performing sequential partial sum on the generated raw bit string,
   wherein the sequential partial sum indicates each partial sum calculated by shifting a selection range of sample values by one bit when a predetermined number of partial sums are selected from among the generated raw bit string.

2. The method of claim 1, wherein the generating of the raw bit string comprises comparing a sample value from the sampling with a predetermined reference value to generate the raw bit string.

3. The method of claim 1, wherein the performing sequential partial sum comprises:
applying a mask of a predetermined size to the raw bit string to calculate a parity bit; and
calculating a next parity bit while moving the mask at least one bit from a point where a current parity bit is generated.

4. The method of claim 1, further comprising removing deviation in the input physical signals, prior to the sampling.

5. The method of claim 4, wherein the removing of the deviation comprises removing the deviation by using one of a direct current (DC) filter and an automatic deviation compensation circuit.

6. A method, performed by a random number generation apparatus, for generating a random number having a signal source biasing removed, the method comprising:
generating raw bit strings for respective physical signals by sampling the physical signals input from a plurality of signal sources, at a predetermined cycle;
generating a plurality of parity bit strings by performing block partial sum or sequential partial sum on the respective raw bit strings; and
generating the random number by sequentially arranging parity bits included in the plurality of parity bit strings in a generation sequence of the parity bits,
wherein the block partial sum is calculated for checking whether the number of "1" bits or "0" bits in each block is an even number or an odd number, where said each block is divided from the generated raw bit string and includes a predetermined number of bits, and
the sequential partial sum indicates each partial sum calculated by shifting a selection range of sample values by one bit when a predetermined number of partial sums are selected from among the generated raw bit string.

7. The method of claim 6, further comprising removing deviation included in the input physical signal, prior to the sampling.

8. The method of claim 7, wherein the removing of the deviation comprises removing the deviation by using one of a direct current (DC) filter and an automatic deviation compensation circuit.

9. An apparatus for generating a random number having a signal source biasing removed, the apparatus comprising:
a signal source configured to generate a physical signal as a basis for generating the random number;
a clock generator configured to generate a clock having a predetermined frequency;
a sampler configured to output a bit value of 0 or 1 according to a result obtained by comparing a value from sampling the physical signal with a predetermined reference value at each clock; and
a calculator configured to perform sequential partial sum on a bit string as an output of the sampler to generate the random number,
wherein the sequential partial sum indicates each partial sum calculated by shifting a selection range of sample values by one bit when a predetermined number of partial sums are selected from among the generated raw bit string.

10. The apparatus of claim 9, further comprising one of a direct current (DC) filter and an automatic deviation compensation circuit, the one of the DC filter and the automatic gain circuit are configured to remove deviation of the physical signal,
wherein the sampler is further configured to sample an output signal of the one of the DC filter and the automatic deviation compensation circuit.

11. An apparatus for generating a random number having a signal source biasing removed, the apparatus comprising:
a plurality of random number generators, each configured to generate a raw bit string from physical phenomena; and
a calculator configured to:
generate a plurality of parity bit strings by performing block partial sum or sequential partial sum on the respective raw bit strings generated by the plurality of random number generators, and
generate a random number sequence by sequentially arranging respective parity bits included in the plurality of parity bit strings in a generation sequence of the parity bits,
wherein the block partial sum is calculated for checking whether the number of "1" bits or "0" bits in each block is an even number or an odd number, where said each block is divided from the generated raw bit string and includes a predetermined number of bits, and
the sequential partial sum indicates each partial sum calculated by shifting a selection range of sample values by one bit when a predetermined number of partial sums are selected from among the generated raw bit string.

12. The apparatus of claim 11, wherein each random number generator comprises:
a signal source configured to generate a physical signal as a basis for generating the random number;
a clock generator configured to generate a clock having a predetermined frequency; and
a sampler configured to output a bit value of 0 or 1 according to a result obtained by comparing a value from sampling the physical signal with a predetermined reference value at each clock.

13. The apparatus of claim 12, wherein each of the random number generators further comprises:
a compensation control circuit configured to:
analyze deviation from a value obtained from the sampling and
feedback to the sampler a feedback signal for removing the deviation.

14. A method, performed by a random number generation apparatus, for generating a random number having a signal source biasing removed, the method comprising:
generating raw bit strings for respective physical signals by sampling the physical signals input from a plurality of signal sources, at a predetermined cycle;
generating a plurality of parity bit strings by performing sequential partial sum on the respective raw bit strings; and
generating the random number by sequentially arranging parity bits included in the plurality of parity bit strings in a generation sequence of the parity bits,
wherein the sequential partial sum indicates each partial sum calculated by shifting a selection range of sample values by one bit when a predetermined number of partial sums are selected from among the generated raw bit string.

* * * * *